No. 748,432. PATENTED DEC. 29, 1903.
C. W. STANTON.
SMOKE CONSUMING FURNACE.
APPLICATION FILED OCT. 10, 1902.
NO MODEL.
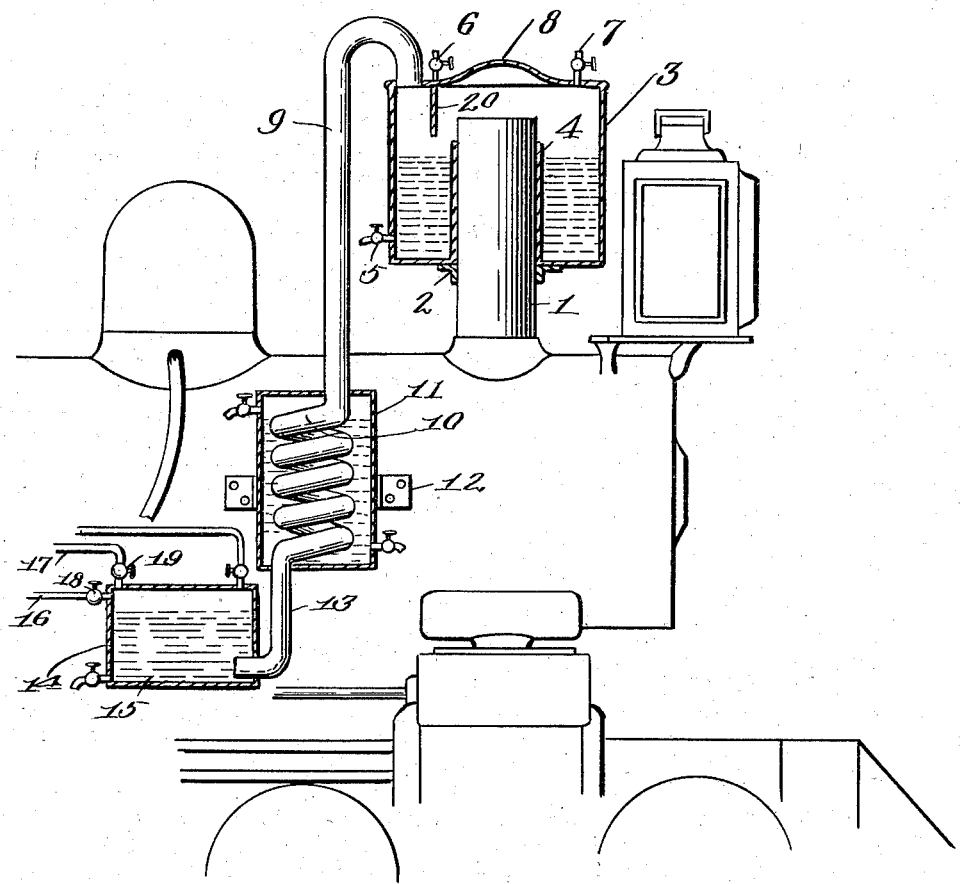
Witnesses:
James L. Norris, Jr.
C. S. Kesler
Inventor
Charles W. Stanton
By James L. Norris.
Atty.

No. 748,432. Patented December 29, 1903.

UNITED STATES PATENT OFFICE.

CHARLES WALDREN STANTON, OF MOBILE, ALABAMA.

SMOKE-CONSUMING FURNACE.

SPECIFICATION forming part of Letters Patent No. 748,432, dated December 29, 1903.

Application filed October 10, 1902. Serial No. 126,783. (No model.)

*To all whom it may concern:*

Be it known that I, CHARLES WALDREN STANTON, a citizen of the United States, residing at Mobile, in the county of Mobile and State of Alabama, have invented new and useful Improvements in Smoke-Consuming Furnaces, of which the following is a specification.

This invention relates to certain new and useful improvements in smoke-consuming apparatus, and it is particularly adapted for condensing the products of combustion as well as preventing the escape to the atmosphere of the uncondensed products.

The invention is applicable for locomotives and furnaces of various characters and aims to construct a smoke-consuming apparatus which will be extremely simple in its construction, strong, durable, efficient in its use, comparatively inexpensive to set up, and readily adaptable to furnaces, locomotives, and the like.

To this end the invention consists in the novel combination and arrangement of parts hereinafter more specifically described, illustrated in the accompanying drawing, and particularly pointed out in the claim hereunto appended.

In describing the invention in detail reference is had to the accompanying drawing, forming a part of this specification and which illustrates a sectional elevation of the smoke-consuming apparatus as applied to a locomotive.

Referring to the drawing by reference characters, 1 denotes the stack of a locomotive, provided with a collar 2, upon which is adapted to be seated a tank 3, which is provided with an inwardly-extending sleeve 4, arranged around the stack 1. The tank 3 is provided with the discharge-outlet 5, an inlet-pipe 6, and a gage 7. The tank 3 projects a suitable distance above the top of the stack and has its cover swelled upward, as at 8. Within the tank 3 is adapted to be placed a suitable quantity of liquid, the level of which is a suitable distance below the top of the stack.

Connected to the top or cover of the tank 3 and communicating with the interior thereof is a take-off pipe 9, the lower end of which terminates into a condensing-worm 10, arranged in a receptacle 11. The receptacle 11 is adapted to contain a suitable cooling medium and is connected to one side of the locomotive-boiler, as at 12. The receptacle 11 is provided with a suitable inlet and a suitable outlet cock for the cooling medium.

The lower end of the worm 10 terminates into a discharge-pipe 13, which projects or depends downwardly from the receptacle 11, and its lower end projects into a vessel 14, provided with a liquid seal 15. The vessel 14 is provided with a suitable inlet and outlet cock for the liquid seal. The vessel 14 is further provided with a draw-off pipe 16 for the products of condensation and a draw-off pipe 17 for the uncondensed products. The pipes 16 17 are provided with valves 18 19, respectively.

The operation of the device is as follows: The products of combustion pass up through the stack 1 and out therefrom into the tank 3. The heavy portion thereof will fall into the liquid or water within the tank and the lighter portion will be deflected by the deflector 20 into the take-off pipe 9 and thence into the condensing apparatus, where it will be condensed. The products of condensation will be discharged into the vessel 14, where they will be discharged through the pipe 16. The uncondensed products or gases will also be discharged into the vessel 14 and be exhausted therefrom through the pipe 17 and be carried to the fire-box to be consumed therein, or other desirable disposition can be made of these gases. The liquid seal in the vessel 14 will prevent back pressure of air to the worm, as well as to the stack, and will also prevent the uncondensed gases or products from escaping to the atmosphere until they are exhausted through the pipe 17. The tank 3 is hermetically closed. The heavy products of combustion which do not pass through the take-off pipe 9, as before stated, fall to the bottom of the tank 3 or upon the water therein and are discharged through the outlet 5. The water-level in the vessel 3 is determined through the gage 7, and the water or other liquid is replenished through the inlet 6.

From the foregoing description, taken in connection with the accompanying drawing, it will be evident that I have devised a smoke-consuming apparatus which will not only consume the smoke, but condense various portions of the products of combustion, so that these condensed products can be used, if desired, for other purposes, and that the uncondensed products or gases can be discharged into the fire-box to be consumed again, and it will also be evident that I have devised a means to prevent the escape of the uncondensed gases to the atmosphere, and it is thought the many advantages from such a construction of smoke-consuming apparatus can be readily understood, and it will furthermore be evident that various changes in the details of construction can be made without departing from the general spirit of the invention, and it will also be evident that the smoke-consuming apparatus is adapted for use with furnaces of every description and that I have shown the apparatus in connection with a locomotive to more clearly illustrate the invention.

Having thus fully described my invention, what I claim as new, and desire to secure by Letters Patent, is—

The combination with a stack, of a closed separating-tank surrounding and inclosing the upper portion of the said stack and having its top provided with a depending deflector arranged near one side thereof, said tank further provided with a water inlet and outlet and further adapted to contain a body of water whose level is at a point removed from the top of the stack, a condensing apparatus, a take-off pipe for establishing communication between said condensing apparatus and said separating-tank, said pipe connected to the top of said tank near the said side thereof, and opening into the space formed between the side of the tank and the deflector, said pipe adapted to carry off the smoke issuing from the stack and a receptacle adapted to communicate with said condensing apparatus for receiving the condensed and uncondensed products, said receptacle adapted to contain a liquid forming thereby a seal.

In testimony whereof I have hereunto set my hand in presence of two subscribing witnesses.

CHARLES WALDREN STANTON.

Witnesses:
JOHN RALSTON,
H. T. BOGA.